United States Patent [19]

Yamazaki et al.

[11] Patent Number: 4,519,747
[45] Date of Patent: May 28, 1985

[54] METHOD FOR ASSEMBLING AN IMPELLER ONTO A TURBOSHAFT

[75] Inventors: Masami Yamazaki; Sueo Shibata, both of Okazaki, Japan

[73] Assignee: Toyota Jidosha Kogyo Kabushiki Kaisha, Toyota, Japan

[21] Appl. No.: 375,213

[22] Filed: May 5, 1982

[30] Foreign Application Priority Data

Jan. 20, 1982 [JP] Japan .................................. 57-6119

[51] Int. Cl.$^3$ .......................... F04D 29/22; F16B 4/00
[52] U.S. Cl. ................................ 416/244 A; 403/259; 403/282; 29/432; 29/520
[58] Field of Search ....................... 415/244 R, 244 A; 403/281, 282, 259, 284; 29/432, 520; 417/407

[56] References Cited

U.S. PATENT DOCUMENTS 2,486,769 11/1949 Watson, Jr. ...................... 29/520 X
3,211,362 10/1965 Laskey et al. ..................... 417/407
3,467,419 9/1969 Anderson et al. ........... 416/244 A X
4,257,744 3/1981 Watson ........................... 403/282 X

OTHER PUBLICATIONS

IBM Technical Disclosure, "Double Clinch Lock Components for Ferrous to Nonferrous Assemblies", vol. 20, No. 5, (Oct. 1977).

Primary Examiner—Robert E. Garrett
Assistant Examiner—Joseph M. Pitko
Attorney, Agent, or Firm—Kenyon & Kenyon

[57] ABSTRACT

An impeller is assembled onto a turboshaft such that the impeller is deformed at its end walls so as to deform the inner wall of the hole of the impeller against the shaft such that the clearance between the shaft and the hole of the impeller is reduced to zero, thereby, preventing bending or offsetting of the shaft relative to the impeller. For causing the deformation of the shaft, washers with a circular projection are disposed on both sides of the impeller, with the projection facing the end walls of the impeller. The washers and the impeller are clamped by a nut which is screwed to the threaded end of the shaft, resulting in the projection being forced into the end wall of the impeller, thereby deforming the impeller.

6 Claims, 16 Drawing Figures

METHOD FOR ASSEMBLING AN IMPELLER ONTO A TURBOSHAFT

BACKGROUND OF THE INVENTION

1. Field of the Invention

The present invention relates to a turbocharger used in an internal combustion engine, especially to a method for assembling an impeller onto a turboshaft.

2. Description of the Prior Art

Turbochargers are being increasingly used in internal combustion engines to obtain higher power. Turbochargers, which deliver a supercharge of air to the engine, are used at very high speeds which may exceed 100,000 rpm. Therefore, it is very important for them to be balanced in their rotating mass. The rotating mass of turbochargers comprises the turbine spun by the exhaust gas, the impeller or compressor rotor spun by the turbine through the shaft, and other elements such as spacers, thrust collars, and nuts mounted on the shaft. To obtain a well balanced rotating mass, the above components are machined to a high precision. The turbine and the impeller are especially important due to their functions, sizes, and masses.

These components, however, have to be assembled into a unit and even if each component is precision machined, it is still difficult to obtain a well balanced assembly. It is not so difficult to balance the turbine relative to the shaft, as the turbine is integrated together with the shaft and machined as a unit, but it is very difficult to assemble the impeller onto the shaft. The shaft integrated with the turbine is known as a turboshaft.

Conventionally, the shaft is first inserted into an axial hole in the impeller, than the impeller is clamped by a nut with a force great enough to enable torque to be transmitted from the shaft to the impeller and to fix the axial position of the impeller. The great force by which the nut is clamped in this operation tends to bend the part of the shaft holding the impeller. Further, the shaft may be clamped offset from the impeller center axis within the clearance between the shaft outer wall and the inner surface of the impeller hole.

To prevent the above-mentioned bending and offsetting of the shaft, it is desirable to minimize the clearance between the shaft outer wall and the inner wall of the hole. This, however, would reduce the efficiency of assembly work. In practice, also, zero clearance cannot be achieved due to the need for dimensional tolerances even with precision machined components.

SUMMARY OF THE INVENTION

It is an object of the present invention to provide a method for assembling an impeller onto a turboshaft which can obviate the above problems.

Another object of the present invention is to provide a turbocharger which can be more easily assembled and is excellent in rotating balance.

One object of the present invention is attained by a method for assembling an impeller onto a turboshaft which is integrated with a turbine at one end thereof, the impeller having flat end walls in the central region thereof between which end walls an axial hole extends, said flat end walls being parallel to each other and perpendicular to the impeller center axis, said method comprising the steps of: inserting the turboshaft through the axial hole in the impeller; and deforming the impeller by applying an axial force to said end walls of the impeller such that the clearance between the outer wall of the turboshaft and the inner wall of said axial hole of the impeller is reduced to zero at the resultant deformed areas.

Another object of the present invention is attained by a turbocharger comprising an impeller and a turboshaft which is integrated with a turbine at one end thereof, the impeller being fitted to the turboshaft via an axial hole provided in the impeller, end walls of the impeller being deformed concentrically around said axial hole such that the clearance between the outer wall of the turboshaft and the inner wall of said axial hole of the impeller is reduced to zero at the resultant deformed areas.

BRIEF DESCRIPTION OF THE DRAWINGS

Further features and advantages of the present invention will become apparent from the following description with reference to the attached drawings, which illustrates nonlimitative embodiments thereof, in which.

DESCRIPTION OF PREFERRED EMBODIMENTS

Figure 1:
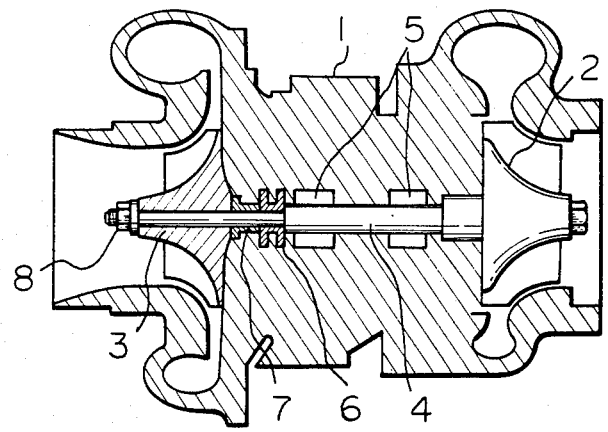
FIG. 1 shows a schematic section of a conventional turbocharger used in an automobile.
Figure 2:
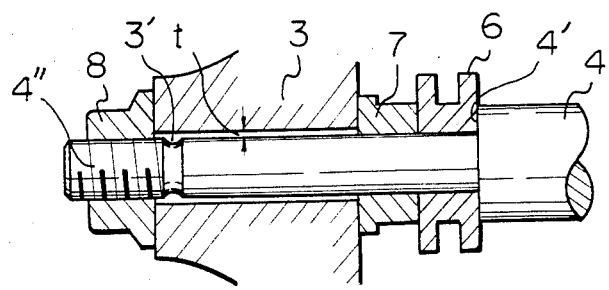
FIG. 2 shows an enlarged section of a rotating mass of the turbocharger in FIG. 1.

FIGS. 1 and 2 show several main components of a conventional turbocharger housed in a casing 1. As is well known, the turbocharger comprises a turbine 2, which is spun by the exhaust gas from the engine, and an impeller 3 or a compressor rotor which is spun by the turbine 2 via a turboshaft 4 and compresses the intake air to the engine. The impeller 3 has a hole 3' into which the shaft 4 is to be inserted. The turboshaft 4 is rotatably supported by bearings 5. The impeller 3 is rigidly secured onto the shaft 4 at one end portion and the turbine 2 is integrated with the shaft 4 at the opposite end portion. To maintain the axial position of the shaft 4, a thrust collar 6 and a spacer 7 are disposed between the impeller 3 and the bearing 5. The thrust collar 6 is rotatably secured to the peripheral casing element (not shown) and abuts on one side a shoulder 4' of the shaft 4. The shoulder 4' is formed by a change in the outer diameter of the shaft 4. The outer diameter is smaller toward the end portion onto which the impeller 3 is to be secured. The impeller 3 is clamped by a nut 8 which is screwed to the threaded end portion 4" of the shaft 4.

The nut 8 urges the impeller 3 against the spacer 7 and the thrust collar 6. The thrust collar 6 is thus frictionally supported against the shoulder 4' of the shaft 4. Thus, the clamping force of the nut 8 must be great enough to transmit the torque from the shaft 4 to the impeller 3 as well as to hold the axial position of the impeller 3 on the shaft 4.

To facilitate the assembly work, it is advantageous to provide a clearance t in the order, for example, of a micron between the outer wall of the shaft 4 and the inner wall of the hole 3' of the impeller 3 thereby allowing the shaft 4 to be smoothly inserted into the hole 3'. Provision of a clearance t, however, would mean that the smaller diameter section of the shaft 4 from the shoulder 4' would tend to bend within the clearance t of the hole 3' if the end wall of the spacer 6 or the nut 8 were not exactly normal to the center axis of the shaft 4, as shown in an exaggerated fashion in FIG. 3a, or would tend to be fitted offset from the center axis of the impeller 3, as shown in an exaggerated fashion in FIG. 3b.

Figure 4:
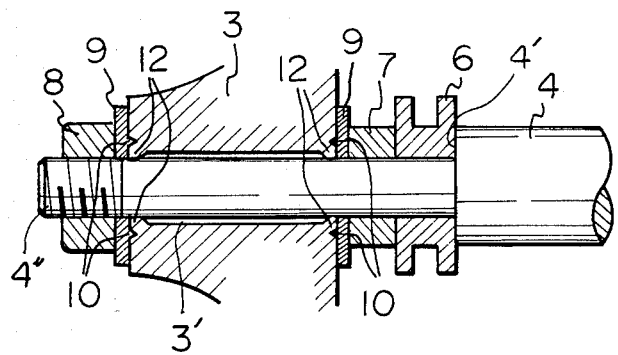
FIG. 4 shows a section of an embodiment of a turbocharger, according to the present invention.
Figure 5A:
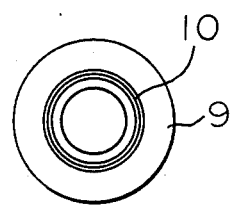
FIGS. 5a and 5b show a plan view of a washer used in FIG. 3.
Figure 5B:
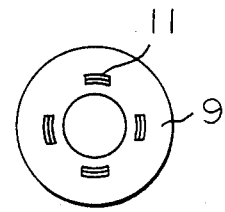

FIG. 4 shows a preferred embodiment of a turbocharger according to the present invention, in which the corresponding parts are represented by the same numerals as in FIGS. 1 and 2. This embodiment differs from that of FIGS. 1 and 2 in having washer 9 arranged on both sides of the impeller 3. Each washer 9 has a circular projection 10 or 11 (FIGS. 5a and 5b) about its center axis. The circular projection is concentrically formed around the hole into which the shaft is inserted and consists of a continuous circle in FIG. 5a and of a partially discontinuous circle in FIG. 5b. Each washer 9 is arranged with its projecting side facing the end walls of the impeller 3, said end walls extending parallel to each other and perpendicular to the center axis of the impeller 3 in the central region thereof for abutting the other elements, such as the nut 8 and the spacer 7.

The impeller 3 and the shaft 4 are usually made of separate materials, for example, the impeller 3 of a light alloy and the shaft 4 of steel. This means that the impeller 3 is deformed easier than the shaft 4. With the above-mentioned arrangement, as shown in FIG. 4, the nut 8 is screwed to the threaded shaft end 4" to clamp the impeller 3 onto the shaft 4. As the clamping force is increased, the projections 10 or 11 are forced into the end walls of the impeller 3, causing the end walls of the impeller 3 to deform. The deformation extends toward the shaft 4 if space or clearance exists between the inner wall of the hole 3' of the impeller 3 and the outer wall of the shaft 4, so that the inner wall forming the hole 3' deforms adjacent to the end walls of the impeller 3 as shown by the numeral 12 in FIG. 4, reducing the clearance to zero at the resultant deformed areas. The features of the deformation are described below.

Figure 6A:
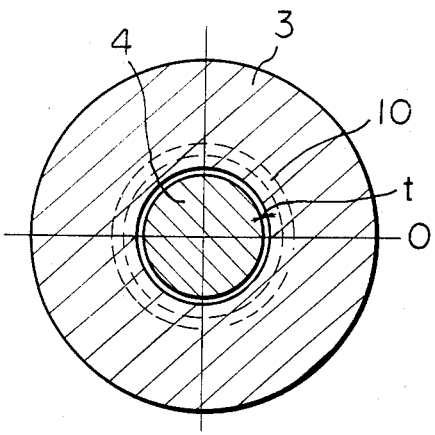
FIGS. 6a, 6b, and 6c show views illustrating the steps of deformation when an impeller is inserted over a turboshaft with their axes coinciding before deformation.
Figure 6B:
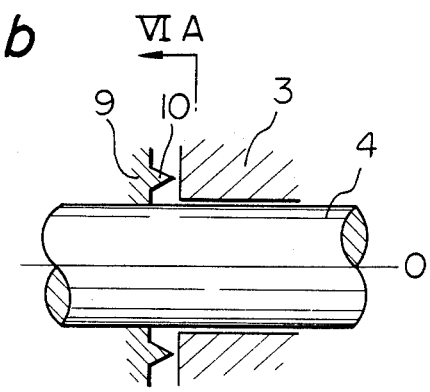
Figure 6C:
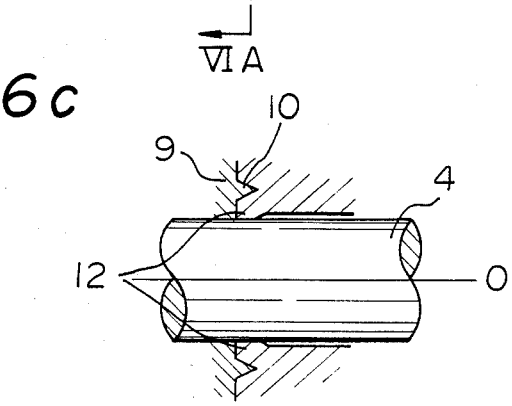

FIGS. 6a, 6b, and 6c show the steps of the deformation when the impeller 3 and the shaft 4 are assembled coaxially before deformation. The circular projection 10 or 11 of the washer 9 is located about the same center axis O, as shown in FIGS. 6a and 6b, thus the deformation arises uniformly around the shaft 4, as shown in FIG. 6c, reducing the clearance to zero with the axes coinciding.

Figure 3A:
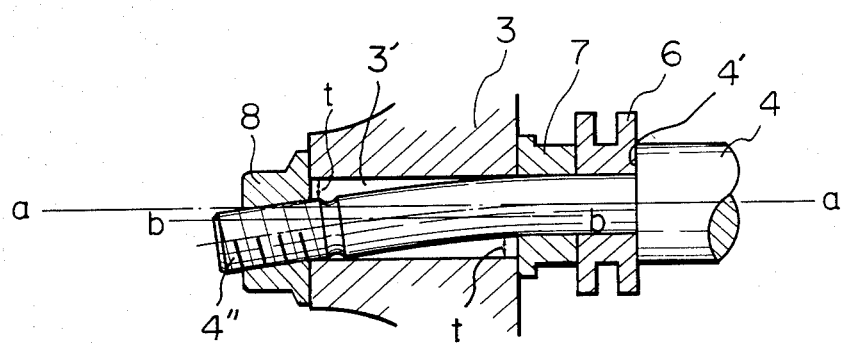
FIG. 3a shows a view in which a shaft is bent within a clearance.
Figure 3B:
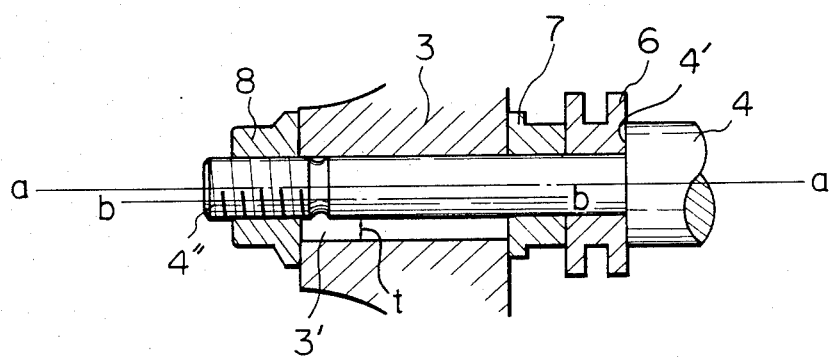
FIG. 3b shows a view in which a shaft is offset within a clearance.
Figure 7A:
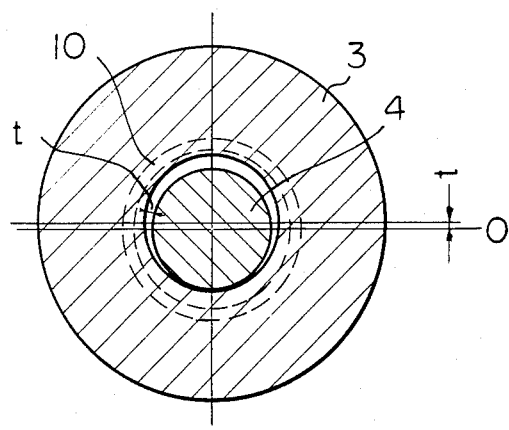
FIGS. 7a, 7b, and 7c show views illustrating the steps of deformation when an impeller is inserted over a turboshaft with their axes offset before deformation.
Figure 7B:
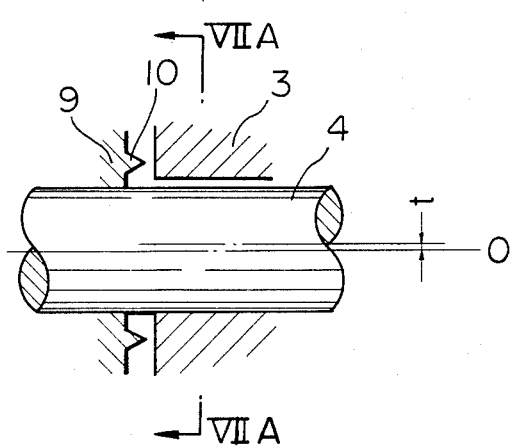
Figure 7C:
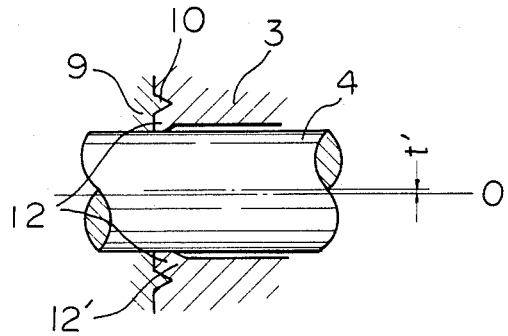

FIGS. 7a, 7b and 7c show the steps of the deformation when the impeller 3 and the shaft 4 are assembled offset at a distance t, corresponding to the clearance before deformation, as is liable to occur in many cases when clearance exists. In conventional turbochargers, this probably would have resulted in the shaft being assembled bent or offset, as shown in FIGS. 3a and 3b. According to the present invention, however, the washers 9 and the shaft 4 are initially located offset from the center axis O of the impeller 3, as shown in FIGS. 7a and 7b, but the distance t of the offset is decreased by the deformation, as shown in FIG. 7c. The details of the deformation are as follows: The deformation does not arise instantly, but rather progressively over a certain time during the nut screwing. The shaft 4 is urged by the deformed wall portion 12' which is located close to the shaft 4 when the clearance still remains, thereby reducing the distance t' between the axes of the impeller 3 and the shaft 4. Therefore, the deformation, according to the present invention, has the effect of centering the shaft 4 relative to the impeller 3.

Further, the deformation, according to the present invention, has the effect of preventing the shaft from being bent within the hole 3' of the impeller 3 such as shown in FIG. 3a, because there is zero clearance at both end walls of the impeller 3 where the deformation arises.

Figure 8:
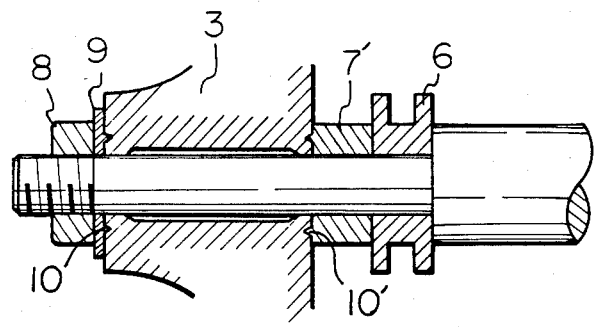
FIG. 8 shows a section of another embodiment of a turbocharger, according to the present invention.

FIG. 8 shows another turbocharger shaft assembly, in which the washer 9 located on the turbine side is omitted. Instead, a circular projection 10' is provided on the spacer 7' facing the impeller 3. The circular projection 10' is similar to those illustrated in FIG. 5a or 5b. This arrangement causes deformation in a similar way as described above.

Figure 9A:
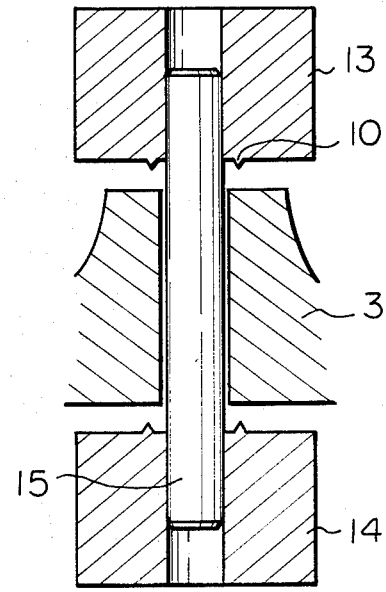
FIGS. 9a and 9b show a section of still another embodiment of the present invention, in which an impeller is deformed in a die prior to assembly.
Figure 9B:
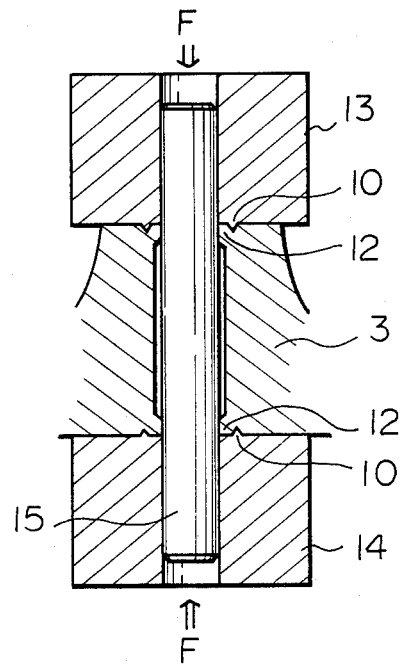

FIGS. 9a and 9b show another embodiment of the present invention, in which the impeller 3 is deformed prior to fitting the impeller 3 onto the turbo shaft 4. For this purpose, a device comprising a pair of press means 13, 14 and a guide shaft 15 is prepared. Each of the press means is provided with a projection 10 or 11 similar to those illustrated in FIGS. 5a and 5b. The outer diameter of the guide shaft 15 is equal to that of the turbo shaft to be assembled. After inserting the impeller 3 into the device, as shown in FIG. 9a, this device causes similar deformation 12 by applying the force F to the press means 13, 14 in the inward direction shown by the arrow in FIG. 9b. The deformed impeller 3 is assembled into the turbocharger after it is drawn from the device. While it is not easy to draw the impeller 3 from the device and to fit it to the shaft because of the zero clearance, it is easier to fit the impeller 3 onto the shaft 4 compared to the case where the impeller and the shaft are machined for a tight fit. This is because the zero clearance according to the invention is restricted to a small distance.

We claim:

1. A turbocharger comprising a turbine, a turboshaft integrated with said turbine and having a free end extending from one side of the turbine, the free end including a straight cylindrical portion, and an impeller having opposite end faces and an axial hole therethrough, the impeller fitting in spaced relation to the one side of the turbine on the straight cylindrical portion of the free end of the turboshaft via said axial hole, wherein each end face of the impeller is plastically deformed axially inwardly in a circular pattern around said axial hole so as to create a circumferentially uniform, radially inward plastic deformation of the material of the impeller sufficient to eliminate any clearance between the inner surface of the axial hole adjacent to the end faces of the impeller and the outer surface of said straight cylindrical portion of the turboshaft.

2. A turbocharger according to claim 1, further comprising washer means disposed on the turboshaft contiguous to the respective end faces of the impeller, each of the washer means having a circular projection on a side thereof in contact with the corresponding end face of the impeller and the material of the washer means being harder than the material of the impeller, the diameter of the circular projection and the cross section thereof for each washer being preselected to cause said deformation in the corresponding end face of the impeller.

3. A turbocharger according to claim 2 wherein the circular projection of the washer means is formed as a continuous circular profile.

4. A turbocharger according to claim 2 wherein the circular projection of the washer means is formed as a discontinuous circular profile.

5. A turbocharger according to claim 2 wherein one of said washer means comprises a spacer disposed between the one side of the turbine and said impeller.

6. A turbocharger according to claim 2 wherein the free end of the turboshaft has a threaded portion outboard of said straight cylindrical portion, and the turbocharger further comprises a nut secured on said threaded portion with sufficient torque to press the washers into the respective end faces of the impeller to cause said radially inward plastic deformation in the corresponding end face of the impeller.

* * * * *